United States Patent
Zingler et al.

(10) Patent No.: US 9,661,536 B2
(45) Date of Patent: May 23, 2017

(54) METHOD FOR AN IMPROVED MEASUREMENT HANDLING BY A USER EQUIPMENT IN A MULTI-RAT AND/OR MULTI-FREQUENCY AND/OR SINGLE-FREQUENCY RADIO ENVIRONMENT OF A PUBLIC LAND MOBILE NETWORK, PUBLIC LAND MOBILE NETWORK

(71) Applicant: DEUTSCHE TELEKOM AG, Bonn (DE)

(72) Inventors: Olaf Zingler, Bonn (DE); Frank Lehser, Bonn (DE); Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/890,590

(22) PCT Filed: May 6, 2014

(86) PCT No.: PCT/EP2014/059182
§ 371 (c)(1),
(2) Date: Nov. 12, 2015

(87) PCT Pub. No.: WO2014/184049
PCT Pub. Date: Nov. 20, 2014

(65) Prior Publication Data
US 2016/0088536 A1   Mar. 24, 2016

(30) Foreign Application Priority Data
May 16, 2013   (EP) ..................................... 13168044

(51) Int. Cl.
*H04B 17/00*   (2015.01)
*H04W 24/00*   (2009.01)
(Continued)

(52) U.S. Cl.
CPC ... *H04W 36/0088* (2013.01); *H04W 36/0055* (2013.01); *H04W 36/10* (2013.01);
(Continued)

(58) Field of Classification Search
CPC ......... H04W 36/0066; H04W 36/0083; H04W 16/28; H04W 36/22; H04W 36/30; H04W 74/002; H04W 36/0088
(Continued)

(56) References Cited

U.S. PATENT DOCUMENTS 6,330,459 B1 * 12/2001 Crichton ............... H04W 16/28
455/434
7,065,324 B2 * 6/2006 Mee ........................ H04L 43/16
342/357.48
(Continued)

FOREIGN PATENT DOCUMENTS

CN   101352091 A   1/2009
CN   102014422 A   4/2011
(Continued)

*Primary Examiner* — William D Cumming
(74) *Attorney, Agent, or Firm* — Leydig, Voit & Mayer, Ltd.

(57) ABSTRACT

A method for improved measurement handling by a user equipment in a multi-Radio Access Technology (RAT) and/or multi-frequency and/or single-frequency radio environment of a public land mobile network includes: transmitting a measurement activation/deactivation information from a serving cell base station to the user equipment, the measurement activation/deactivation information being related to future inter-frequency and/or inter-RAT and/or intra-frequency measurements towards a neighbor cell base station entity to be either activated or set to a non-permanent state.

13 Claims, 1 Drawing Sheet

(51) Int. Cl.
*H04W 4/00* (2009.01)
*H04W 36/00* (2009.01)
*H04W 72/00* (2009.01)
*H04M 1/00* (2006.01)
*H04W 36/10* (2009.01)
*H04W 36/30* (2009.01)
*H04W 36/36* (2009.01)
*H04W 36/14* (2009.01)
*H04W 88/06* (2009.01)

(52) U.S. Cl.
CPC ........... *H04W 36/30* (2013.01); *H04W 36/36* (2013.01); *H04W 36/14* (2013.01); *H04W 88/06* (2013.01)

(58) Field of Classification Search
USPC .... 455/67.11, 425, 436, 435, 574, 424, 434, 455/453, 226.1, 435.2
See application file for complete search history.

(56) References Cited

U.S. PATENT DOCUMENTS

| | | | | |
|---|---|---|---|---|
| 8,526,888 | B2* | 9/2013 | Cave | H04W 36/0083 455/226.1 |
| 9,113,351 | B2* | 8/2015 | Cave | H04W 36/0083 |
| 2003/0069752 | A1* | 4/2003 | LeDain | G06F 19/3418 705/2 |
| 2003/0157896 | A1* | 8/2003 | Mee | H04L 43/16 455/67.11 |
| 2005/0221824 | A1* | 10/2005 | Lee | H04W 36/0066 455/435.2 |
| 2005/0248749 | A1* | 11/2005 | Kiehn | G01S 7/4873 356/28 |
| 2006/0142021 | A1* | 6/2006 | Mueckenheim | H04W 36/22 455/453 |
| 2007/0072610 | A1* | 3/2007 | Qiao | H04W 36/30 455/436 |
| 2007/0097914 | A1 | 5/2007 | Grilli et al. | |
| 2008/0167089 | A1* | 7/2008 | Suzuki | H04L 1/1829 455/574 |
| 2008/0318577 | A1* | 12/2008 | Somasundaram | H04W 36/0066 455/436 |
| 2009/0046641 | A1* | 2/2009 | Wang | H04W 74/002 370/329 |
| 2009/0092056 | A1 | 4/2009 | Kitazoe | |
| 2009/0270096 | A1* | 10/2009 | Somasundaram | H04J 11/0093 455/434 |
| 2009/0270103 | A1* | 10/2009 | Pani | H04W 36/0083 455/436 |
| 2010/0255835 | A1* | 10/2010 | Suzuki | H04L 1/1829 455/425 |
| 2010/0296488 | A1* | 11/2010 | Kuo | H04W 36/0088 370/332 |
| 2010/0322079 | A1* | 12/2010 | Kitazoe | H04W 36/0088 370/241 |
| 2011/0105112 | A1* | 5/2011 | Cave | H04W 36/0083 455/424 |
| 2013/0329589 | A1* | 12/2013 | Cave | H04W 36/0083 370/252 |
| 2015/0358849 | A1* | 12/2015 | Cave | H04W 36/0083 370/252 |

FOREIGN PATENT DOCUMENTS

| | | |
|---|---|---|
| CN | 102017698 A | 4/2011 |
| WO | WO 2011082988 A1 | 7/2011 |

* cited by examiner

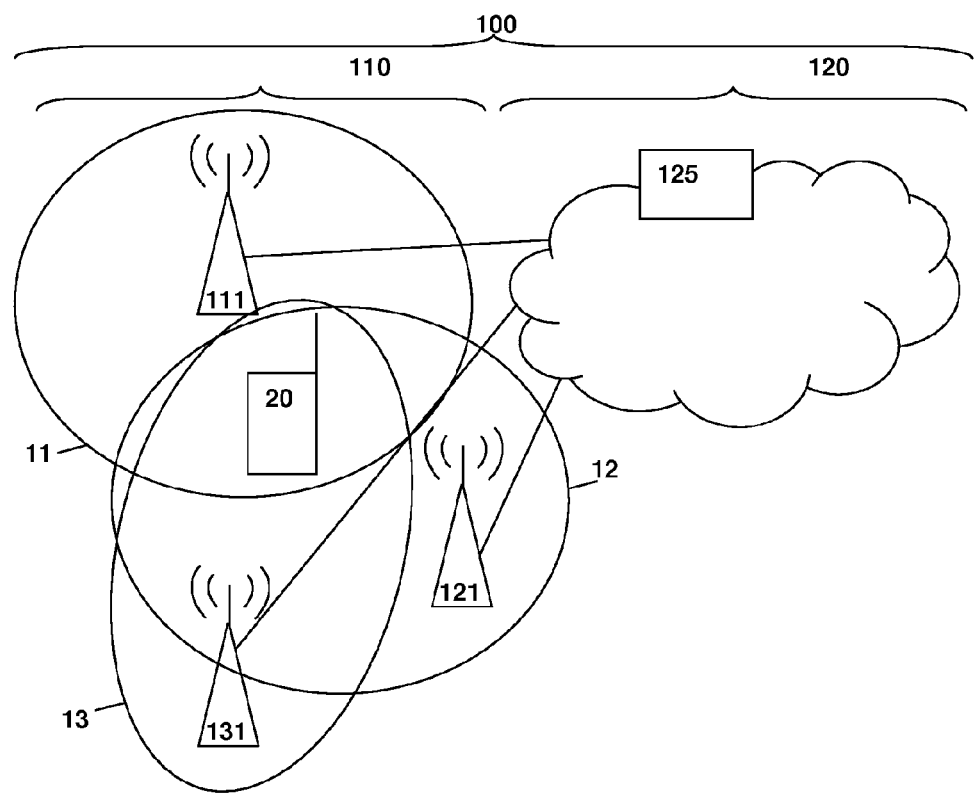

US 9,661,536 B2

METHOD FOR AN IMPROVED MEASUREMENT HANDLING BY A USER EQUIPMENT IN A MULTI-RAT AND/OR MULTI-FREQUENCY AND/OR SINGLE-FREQUENCY RADIO ENVIRONMENT OF A PUBLIC LAND MOBILE NETWORK, PUBLIC LAND MOBILE NETWORK

CROSS-REFERENCE TO RELATED APPLICATIONS

This application is a U.S. National Phase application under 35 U.S.C. §371 of International Application No. PCT/EP2014/059182, filed on May 6, 2014, and claims benefit to European Patent Application No. EP 13168044.9, filed on May 16, 2013. The International Application was published in English on Nov. 20, 2014 as WO 2014/184049 A1 under PCT Article 21(2).

FIELD

The present invention relates inter alia to a method for an improved measurement handling by a user equipment in a multi-RAT and/or multi-frequency and/or single-frequency radio environment of a public land mobile network, the measurement handling being related to inter-RAT (Radio Access Technology) and/or inter-frequency and/or single-frequency radio environment measurements that are performed by the user equipment in dependency of a measurement configuration information transmitted by the public land mobile network to the user equipment.

Furthermore, the present invention relates to a public land mobile network telecommunications network for an improved measurement handling by a user equipment in a multi-RAT and/or multi-frequency and/or single-frequency radio environment of the public land mobile network, the measurement handling being related to inter-RAT (Radio Access Technology) and/or inter-frequency and/or single-frequency radio environment measurements that are performed by the user equipment in dependency of a measurement configuration information transmitted by the public land mobile network to the user equipment.

BACKGROUND

In conventional public land mobile networks, the setting of mobility parameters are based on the serving frequency and/or on probably or typically available target frequencies, which is often only a rough estimation of the used settings; thus the used settings are often not optimal in a typical user situation.

The mobility in cellular radio networks is based on periodic measurements (of the radio environment by the user equipments), exploring the surrounding area, i.e. neighbour cells, of a given (serving) cell to identify if better radio conditions can be provided, by another cell, to the user equipment. In a continuous network layer this is typically given within a given frequency range. In this layer, the measurements must be triggered with a higher periodicity when the signal strength or quality of the cell falls under a certain limit to ensure early identification of a target neighbour cell and to ensure a reliable handover to this target cell.

The situation is more complex if other frequency layers of the same RAT (Radio Access Technology) or even other RATs come into consideration for mobility and must be considered by the terminal for neighbour cell measurements. These measurements are typically more complex because the terminal needs to change the serving frequency (or frequency range) and has to perform a synchronisation to the cells on the other frequency layer (of the same RAT) or on the other RAT.

Network planning activities have the strong tendency to try to configure the network (or network components) in a generic way, i.e. as much as possible without a location specific planning. In the field of mobility, ANR (Automatic Neighbour Relationship), a 3GPP standardised functionality, gives the opportunity to avoid planning neighbour relationships but with the drawback that the terminals (or user equipments) are requested to perform periodic measurements and are configured in a generic way as well. So for all cells, the measurements are periodically triggered to explore intra-frequency, inter-frequency and inter-RAT relationships towards neighbour cells. Even when the neighbour cells are found and configured, the measurements are triggered periodically, at least in case that a certain signal strength or quality threshold is reached in the serving cell.

For intra-frequency relationships, to ensure mobility within a given layer, i.e. within the same radio access technology, such a generic pattern of periodic measurements might be sufficient, but involves drawbacks in other scenarios, such as:

triggering of inter-frequency measurements even if the centre frequency of the respective specific band is not available in the area of a considered (serving) cell and/or triggering of inter-frequency measurements even if the mobility of the user equipment can perfectly be covered by the (neighbouring) cells having the same frequency (or the same frequency band) as the given (serving) cell, and/or triggering of inter-RAT measurements even if the mobility of the user equipment can perfectly be covered by the (neighbouring) cells having the same radio access technology as the given (serving) cell.

Generally, unnecessary measurements—especially inter-frequency and inter-RAT measurements—reduce the throughput from a customer (or subscriber) point of view because transmission gaps during data transfer are required to perform these measurements of another frequency or RAT (with respect to the serving frequency or serving RAT). Additionally, from network point of view unnecessary measurements reduce the statistical reliability of the remaining measurements in the configured measurement gap, if the trigger conditions of the serving cell are reached for these measurements.

SUMMARY

In an embodiment, the invention provides a method for improved measurement handling by a user equipment in a multi-Radio Access Technology (RAT) and/or multi-frequency and/or single-frequency radio environment of a public land mobile network, the measurement handling being related to inter-RAT and/or inter-frequency and/or single-frequency radio environment measurements that are performed by the user equipment based on measurement configuration information transmitted by the public land mobile network to the user equipment. The public land mobile network comprises a plurality of base station entities of different RATs and/or different frequency bands and/or the same frequency band, at least one base station entity of the plurality of base station entities being the serving cell base station entity of the user equipment, the serving base station entity being the single network entity responsible for a control plane between the user equipment and the base station entity, and at least one further base station entity of the plurality of base station entities being a neighbour cell base station entity of the serving base station entity of the user equipment. The method comprises: transmitting a measurement activation/deactivation information from the serving cell base station to the user equipment, the measurement activation/deactivation information being related to future inter-frequency and/or inter-RAT and/or intra-frequency measurements towards the neighbour cell base station entity to be either activated or set to a non-permanent state.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates an example of a telecommunications network, comprising a core network, a radio access network, a user equipment, and a plurality of radio cells.

DETAILED DESCRIPTION

In an embodiment, the invention provides a method for improved measurement handling by a user equipment in a given (serving) radio cell of a multi-RAT and/or multi-frequency and/or single-frequency radio environment of a public land mobile network that allows for a generic network planning of the public land mobile network or of components thereof, such that unnecessary measurements are avoided and hence the customer experience and the measurement quality of the remaining inter-frequency and/or multi-RAT and/or single-frequency measurements are improved.

In an embodiment, the invention provides a method for an improved measurement handling by a user equipment in a multi-RAT and/or multi-frequency and/or single-frequency radio environment of a public land mobile network, the measurement handling being related to inter-RAT (Radio Access Technology) and/or inter-frequency and/or single-frequency radio environment measurements that are performed by the user equipment in dependency of a measurement configuration information transmitted by the public land mobile network to the user equipment, wherein the public land mobile network comprises a plurality of base station entities, at least one base station entity of the plurality of base station entities being the serving cell base station entity of the user equipment, the serving base station entity being defined as the single network entity which is responsible for control plane between the user equipment and the base station entity, and at least one further base station entity of the plurality of base station entities being a neighbour cell base station entity of the serving base station entity of the user equipment, wherein a measurement activation/deactivation information is transmitted from the serving cell base station to all connected user equipments, the measurement activation/deactivation information being related to future inter-frequency and/or inter-RAT and/or intra-frequency measurements towards the neighbour cell base station entity to be either activated or set to a non-permanent state.

It is thereby advantageously possible to optimize the measurement needs for inter-frequency and/or inter-RAT and/or intra-frequency cell relationships in a public land mobile network in order to minimise negative effects on customer equipment as lowering customer downlink data throughput (especially at the edges of the serving radio cell and especially for the inter-RAT and/or inter-frequency situation or possible handover transitions) resulting from these measurements without a need for network planning activities and while the mobility of the user equipments is still ensured. Additionally, avoiding unnecessary measurements leads to a reduced signalling traffic from the terminals (or user equipments) to the network and improves the statistical reliability of the remaining active inter-frequency or inter-RAT and/or intra-frequency measurements, which are generally optimisation targets for implementing public land mobile networks. Such advantageous effects could alternatively only be met by planning and manually configuring measurement periods in a cell-individual manner. However, such an approach would involve enormous continuous configuration efforts which is in contraction with the tendency of a public land mobile network operator to reduce operational efforts (OPEX) and complexity.

According to the present invention, it is advantageously possible to define or configure the measurements (conducted by the user equipments of a serving cell) for the detection of cells on another frequency and/or another radio access technology (than the serving frequency (band) and/or the serving radio access technology) in a self-organising way to reduce the amount of measurements to be performed by the user equipments while reaching an optimal customer experience and increasing the statistical reliability of the remaining active inter-frequency and/or inter-RAT and/or intra-frequency measurements. In an embodiment, the invention addresses measurement needs in typical situations and configurations of serving radio cells with respect to neighbouring radio cells, i.e. in a "normal" operational mode of the cellular mobile network; unusual situations—such as a sudden outage of a surrounding network element (providing the neighbour cell)—might not immediately be addressed in an optimal manner. However, in a typical scenario in real deployments of cellular mobile networks, there is often the situation of a stable network where the network nodes work normally and the network layer of a given frequency band and/or RAT can cover the requested services of the served user equipments, i.e. the signal is mostly or always good enough.

Embodiments of the invention are suitable for various situations, including for example:

a situation where only the behaviour with regard to inter-frequency and/or inter-RAT measurements is influenced, or a situation where the behaviour with regard to inter-frequency and/or inter-RAT and/or intra-frequency measurements is influenced.

In the context of the present invention and regarding different network nodes, the following terminology is adopted: The measurement activation/deactivation information is an information that—for a given measurement as defined in the measurement configuration information—indicates to all connected user equipments in the in the serving cell that the measurement is either activated or set to a non-permanent state which means that in the non-permanent state, the measurement is either not performed for a certain time or the threshold (of a signal strength indicator of the serving cell) that triggers the corresponding measurement is comparably low. The measurement activation/deactivation information is preferably transmitted, from the serving cell base station entity, to the user equipments (of the serving radio cell) as part of the measurement configuration information. However, the measurement activation/deactivation information is not necessarily transmitted as part of the measurement configuration information.

In connected mode of the user equipment, mobility (i.e. handovers between radio cells) is controlled by the network, especially based on measurements conducted by the user equipments and information thereof provided to the network. Based on measurement reports received from the user equipment, the base station entity (typically a NodeB (NB) or an enhanced NodeB (eNB)) may deduce if a handover is needed. In this case, the base station entity may issue conduct a handover to a neighbour cell.

Inter-frequency and inter-RAT as well as intra-frequency mobility requires the user equipment to measure signal parameters of neighbour cells also operating on non-serving carrier frequencies and/or different access technologies respectively. These measurements are performed during from base station entity configured gaps or autonomously configured gaps by the user equipment during which the user equipment cannot receive data. Measurement configurations are controlled by the base station entity, i.e. the base station entity informs the user equipment about when to perform measurements, what to measure, different thresholds for the triggers that trigger the measurements and/or reports.

The serving cell is the cell, i.e. the radio coverage area, of the serving base station entity (or serving cell base station entity) the user equipment is connected to, i.e. the serving base station (entity) is defined as this single entity (of the public land mobile network or of its radio access network) which is responsible for control plane between the user equipment (or terminal) and the base station. The neighbour cells are other cells in close proximity of the serving cell, either on the same frequency or the same frequency band (of the same radio access technology)—relating to intra-frequency measurements—, or on a different frequency—relating to inter-frequency measurements (of the same radio access technology). Neighbour cells can also exist using a different radio access technology, leading to inter-RAT measurements. Typically, a multitude of different inter-frequency and/or inter-RAT and/or intra-frequency neighbour cells (with respect to a serving cell) exist, and hence a multitude of different inter-frequency and/or inter-RAT and/or intra-frequency measurements (or kinds of inter-frequency and/or inter-RAT and/or intra-frequency measurements) potentially exist that can be performed by the user equipments of the serving radio cell. In the following, each different inter-frequency and/or inter-RAT and/or intra-frequency measurement is related with (i.e. will be named) a different neighbour cell or neighbour cell base station entity—even if a plurality of different target frequencies or frequency bands, potentially relating to the same or to different radio access technologies are physically integrated in the same base station entity.

The invention applies to all these different kinds of inter-frequency and/or inter-RAT and/or intra-frequency measurements. Therefore, in the following, an arbitrary kind of inter-frequency and/or inter-RAT and/or intra-frequency measurement (i.e. towards an arbitrary neighbour cell base station entity) is referred to by the wording "inter-frequency and/or inter-RAT and/or intra-frequency measurement towards the neighbour cell base station entity" or "(future) inter-frequency and/or inter-RAT and/or intra-frequency measurement towards the neighbour cell base station entity", and a different kind of inter-frequency and/or inter-RAT and/or intra-frequency measurement (i.e. towards an arbitrary neighbour cell base station entity) is referred to by the wording "further inter-frequency and/or inter-RAT and/or intra-frequency measurement towards a/the further neighbour cell base station entity" or "(future) further inter-frequency and/or inter-RAT and/or intra-frequency measurement towards the further neighbour cell base station entity". These different kinds of inter-frequency and/or inter-RAT and/or intra-frequency measurements could also be referred to by the wording "first inter-frequency and/or inter-RAT and/or intra-frequency measurement towards the first neighbour cell base station entity", "second inter-frequency and/or inter-RAT and/or intra-frequency measurement towards the second neighbour cell base station entity", etc.

In case that the modification of the measurement behaviour according to the present invention is limited to those kinds of neighbour cell base station entities only that are related with a different RAT and/or with a different frequency band (i.e. inter-RAT and/or inter-frequency neighbour cell base station entities)—i.e. the modification of the measurement behaviour does not apply to intra-frequency neighbour cell base station entities—in the following, an arbitrary kind of inter-frequency and/or inter-RAT measurement (i.e. towards an arbitrary neighbour cell base station entity of the inter-RAT and/or inter-frequency type) is referred to by the wording "inter-frequency and/or inter-RAT measurement towards the neighbour cell base station entity" or "(future) inter-frequency and/or inter-RAT measurement towards the neighbour cell base station entity", and a different kind of inter-frequency and/or inter-RAT measurement (i.e. towards an arbitrary neighbour cell base station entity of the inter-RAT and/or inter-frequency type) is referred to by the wording "further inter-frequency and/or inter-RAT measurement towards a/the further neighbour cell base station entity" or "(future) further inter-frequency and/or inter-RAT measurement towards the further neighbour cell base station entity". These different kinds of inter-frequency and/or inter-RAT measurements could also be referred to by the wording "first inter-frequency and/or inter-RAT measurement towards the first neighbour cell base station entity", "second inter-frequency and/or inter-RAT measurement towards the second neighbour cell base station entity", etc.

According to the present invention, it is preferred that in case that the measurement activation/deactivation information indicates future inter-frequency and/or inter-RAT and/or intra-frequency measurements towards the neighbour cell base station entity to be in the non-permanent state, future inter-frequency and/or inter-RAT and/or intra-frequency measurements towards the neighbour cell base station entity are temporarily deactivated.

Likewise, it is preferred according to the present invention that the inter-frequency and/or inter-RAT and/or intra-frequency measurements towards the neighbour cell base station entity are conducted in case that the measurement activation/deactivation information indicates an activation of future inter-frequency and/or inter-RAT and/or intra-frequency measurement, and wherein the inter-frequency and/or inter-RAT and/or intra-frequency measurements towards the neighbour cell base station entity are temporarily deactivated for at least a predetermined time interval in case that the measurement activation/deactivation information indicates a temporary deactivation of the future inter-frequency and/or inter-RAT and/or intra-frequency measurements, wherein the predetermined time interval is preferably longer than at least 24 hours.

Thereby it is advantageously possible, that the non-permanent state of an inter-frequency and/or inter-RAT and/or intra-frequency measurement means the inter-frequency and/or inter-RAT and/or intra-frequency measurement is not completely deactivated but only temporarily deactivated, thus repeated regularly but with a comparably low periodicity of at least 24 hours, preferably of at least 36 hours, or of at least 48 hours or of at least 60 hours or of at least 72 hours.

Furthermore, it is preferred according to the present invention that in case that the measurement activation/deactivation information indicates future inter-frequency and/or inter-RAT and/or intra-frequency measurements towards the neighbour cell base station entity to be in the non-permanent state, future inter-frequency and/or inter-RAT and/or intra-frequency measurements towards the neighbour cell base station entity are configured such that a low measurement threshold is applied, the low measurement threshold preferably being near the minimum required cell quality of the public land mobile network.

Thereby, it is advantageously possible according to the present invention that the inter-frequency and/or inter-RAT and/or intra-frequency measurement, being set to a non-permanent state, is not completely switched off during a comparably long time interval of at least 24 hours or even longer, but that in the situation where the signal strength (of the serving cell base station entity) seen by a user equipment is typically very low, the respective inter-frequency and/or inter-RAT and/or intra-frequency measurement (set to the non-permanent state) is performed nevertheless as it might lead to a handover procedure to the corresponding neighbour cell base station entity, possible providing a better radio coverage for the user equipment.

Still furthermore, it is preferred according to the present invention that in case that the measurement activation/deactivation information indicates activation of future inter-frequency and/or inter-RAT and/or intra-frequency measurements, the inter-frequency and/or inter-RAT and/or intra-frequency measurements are conducted either using autonomous gaps or using an indication from a measurement gap configuration information being part of the measurement configuration information.

Thereby, it is advantageously possible according to the present invention, that in case that a (kind of) inter-frequency and/or inter-RAT and/or intra-frequency measurement (i.e. towards a specific neighbour cell base station entity) is judged beneficial and hence activated, the normal standardized procedure regarding neighbour cell inter-frequency and/or inter-RAT and/or intra-frequency measurements is applied.

According to another preferred embodiment of the present invention, the measurement activation/deactivation information is transmitted to all user equipments connected to the serving cell indicating that inter-frequency and/or inter-RAT measurements towards the neighbour cell base station entity are to be set to the non-permanent state in case that the neighbour cell base station entity is reported, towards the serving cell base station entity, —either on an interface towards an entity of the public land mobile network, or by the user equipment based on at least one previous inter-frequency and/or inter-RAT and/or intra-frequency measurement or based on a plurality of previous inter-frequency and/or inter-RAT and/or intra-frequency measurements—to be unavailable, or a handover procedure towards the neighbour cell base station entity does not occur during a predefined further time interval, or the handover procedures or handovers towards the neighbour cell base station entity are not triggered more often than a configurable attempts threshold (for the counted number of attempts) and/or their success rate (i.e. the success rate of these handover procedure or handovers) is less than a configurable success rate threshold during a predefined further time interval.

Thereby, it is advantageously possible according to the present invention that in a flexible manner those inter-frequency and/or inter-RAT and/or intra-frequency measurements are temporarily deactivated or set to the non-permanent state that related to transitions (or handover procedures/handovers) towards neighbour cells that are either known to be unavailable or that—as evidenced during the predefined further time interval—do not receive any handovers of user equipments from the serving cell.

Furthermore, it is preferred according to the present invention that the measurement activation/deactivation information is transmitted to all user equipments connected to the serving cell indicating that inter-frequency and/or inter-RAT and/or intra-frequency measurements towards the neighbour cell base station entity are to be conducted, in case that the neighbour cell base station entity is reported, towards the serving cell base station entity, —either on an interface towards an entity of the public land mobile network, or by the user equipment based on at least one previous inter-frequency and/or inter-RAT and/or intra-frequency measurement or based on a plurality of previous inter-frequency and/or inter-RAT and/or intra-frequency measurements—to be available, or a handover procedure towards the neighbour cell base station entity does occur.

According to this further embodiment of the present invention, it is advantageously possible that those inter-frequency and/or inter-RAT and/or intra-frequency measurements that are temporarily deactivated or set to the non-permanent state are again activated (or reactivated or set to the periodic state) that are related to a neighbour cell base station entity that is actually working (i.e. the information regarding the activation state of the neighbour cell base station entity being provided (to the serving cell base station entity) via different information channels than the inter-frequency and/or inter-RAT and/or intra-frequency measurement reports) or that is reported to have received a user equipment via a handover procedure.

According to a further embodiment of the present invention, it is preferred that at least another base station entity of the plurality of base station entities is a further neighbour cell base station entity of the serving base station entity of the user equipment, wherein a further measurement activation/deactivation information is transmitted from the serving cell base station to the user equipment, the further measurement activation/deactivation information being related to future further inter-frequency and/or inter-RAT and/or intra-frequency measurements towards the further neighbour cell base station entity to be either activated or temporarily deactivated.

Thereby, it is advantageously possible to flexibly manage the different inter-frequency and/or inter-RAT and/or intra-frequency measurements that are possible to be conducted by a user equipment while avoiding unnecessary inter-frequency and/or inter-RAT measurements.

Furthermore, it is preferred according to the present invention that at an installation time of the serving cell base station entity both the measurement activation/deactivation information indicates that inter-frequency and/or inter-RAT and/or intra-frequency measurements towards the neighbour cell base station entity are to be conducted, and the further measurement activation/deactivation information indicates that further inter-frequency and/or inter-RAT and/or intra-frequency measurements towards the further neighbour cell base station entity are to be conducted.

Thereby, it is advantageously possible to activate all possible kinds of inter-frequency and/or inter-RAT and/or intra-frequency measurements (or at least a majority of the possible kinds of inter-frequency and/or inter-RAT and/or intra-frequency measurements) when a base station entity is newly installed (or newly activated after a shutdown). The consequence is that during a certain time, the functionality of the newly installed base station entity with different user equipments shows that some transitions towards neighbour cell base station entities are not used (for handover procedures of user equipments of the serving cell) in normal conditions of the public land mobile network. After expiration of especially the predefined further time interval, the measurement activation/deactivation information is transmitted to the user equipments indicating that inter-frequency and/or inter-RAT and/or intra-frequency measurements towards such neighbour cell base station entities are to be set to the non-permanent state which means that future measurements regarding these kinds of inter-frequency and/or inter-RAT and/or intra-frequency measurements can either be omitted or can be omitted at least during relatively long time periods (the predetermined time interval) or can be applied only under comparably bad radio coverage conditions, i.e. very low measurement thresholds.

According to the present invention, the public land mobile network comprises a decision and control engine (hereinafter also called decision and control node). The decision and control engine (or node) decides about the generation of specific measurement activation/deactivation information messages in specific cells and thereby controls whether for a specific kind of inter-frequency and/or inter-RAT and/or intra-frequency measurement with respect to a specific relationship of a serving cell and a neighbour cell the inter-frequency and/or inter-RAT and/or intra-frequency measurement should be activated or set to a non-permanent state/be temporarily deactivated (via transmitting a corresponding measurement activation/deactivation information to the concerned user equipments). According to the present invention, there are two main embodiments to realize such a decision and control engine: In a so-called distributed solution, the decision and control engine is provided in the respective local network element, especially the base station entity (of the serving cell of a user equipment), such as the BTS (Base Transceiver Station), the RNC (Radio Network Controller), or the eNB. In a so-called central solution, the decision and control engine is provided in a central entity, typically connected with a network management system of the related network elements such as the BTS (Base Transceiver Station), the RNC (Radio Network Controller), or the eNB.

In the so-called distributed solution, each local network element (of the radio access network)—or at least a plurality of local network elements—comprises/comprise the decision and control engine; only the measurement reports and logging information, especially including counter and/or statistical information related to the number of handover attempts and/or handover successes (i.e. the success rate of the handovers) (respectively concerning specific handover relations), are given to a central instance.

In the so-called central solution, for at least a plurality of local network elements, a decision and control engine is provided in a central entity (with respect to this plurality of local network elements). It is preferred according to the present invention that the decisions are transferred in form of appropriate parameters to the related network elements, such as the BTS (Base Transceiver Station), the RNC (Radio Network Controller), or the eNB.

According to the present invention, also a combined approach could be realized, where for a plurality of local network elements, a decision and control engine is located in a central entity (with respect to this plurality of local network elements) and for a plurality of other local network elements, the decision and control engine is provided in the respective local network elements (of the plurality of other network elements).

According to a further embodiment of the present invention, it is preferred that data indicative of the neighbour cell base station entity being unavailable, and/or the neighbour cell base station entity being available, handover attempts and success rate of the configured inter-frequency and/or inter-RAT and/or intra-frequency neighbour relations are transmitted to a network decision and control node of the public land mobile network.

Thereby, it is advantageously possible to generate—within the decision and control node or in another network entity or network node of the public land mobile network—the measurement activation/deactivation information with respect to specific kinds of inter-frequency and/or inter-RAT and/or intra-frequency measurements based on the knowledge about the availability of certain base station entities of the public land mobile network. The data indicative of the neighbour cell base station entity being unavailable, and/or the neighbour cell base station entity being available especially include counter and/or statistical information related to the number of handover attempts and/or handover successes (i.e. the success rate of the handovers) (respectively concerning specific handover relations).

The present invention also relates to a public land mobile network for an improved measurement handling by a user equipment in a multi-RAT and/or multi-frequency and/or single-frequency radio environment of the public land mobile network, the measurement handling being related to inter-RAT (Radio Access Technology) and/or inter-frequency and/or single-frequency radio environment measurements that are performed by the user equipment in dependency of a measurement configuration information transmitted by the public land mobile network to all active user equipments, wherein the public land mobile network comprises a plurality of base station entities of different RATs and/or different frequency bands and/or the same frequency band, at least one base station entity of the plurality of base station entities being the serving cell base station entity of the user equipment, the serving base station entity being defined as the single network entity which is responsible for control plane between the user equipment and the base station entity, and at least one further base station entity of the plurality of base station entities being a neighbour cell base station entity of the serving base station entity of the user equipment, wherein the public land mobile network is configured such that a measurement activation/deactivation information is transmitted from the serving cell base station to all active user equipments, the measurement activation/deactivation information being related to future inter-frequency and/or inter-RAT and/or intra-frequency measurements towards the neighbour cell base station entity to be either activated or set to a non-permanent state.

Thereby it is advantageously possible according to the present invention to optimize the measurement needs for inter-frequency and/or inter-RAT and/or intra-frequency cell relationships in order to enhance customer experience of user using user equipments. Additionally, avoiding unnecessary measurements leads to a reduced signalling traffic from the user equipments to the network and increase the statistical reliability of remaining inter-frequency and/or inter-RAT and/or intra-frequency measurements, if configured, activated and triggered. All additional features of the preferred embodiments mentioned above with respect to the inventive method also apply—mutatis mutandis—to the public land mobile network according to the present invention. The public land mobile network according to the present invention preferably comprises a decision and control engine or decision and control node such that measurement activation/deactivation information data can be generated and sent to the user equipments (either by the decision and control node itself or by the local network node upon messages received by the decision and control node indicating or requesting to generate such measurement activation/deactivation information data in order to send it to the corresponding user equipments.

Furthermore, the present invention relates to a program comprising a computer readable program code which, when executed on a computer or on a network decision and control node of the public land mobile network or on a base station entity of the public land mobile network, causes the computer or the network decision and control node or the base station entity to perform the inventive method.

The present invention also relates to computer program product for using a core network of a telecommunications network, the computer program product comprising a computer program stored on a storage medium, the computer program comprising program code which, when executed on a computer or on a network decision and control node of the public land mobile network or on a base station entity of the public land mobile network, causes the computer or the network decision and control node or the base station entity to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a public land mobile network 100, i.e. mobile communication network 100, is schematically shown. The public land mobile network 100 comprises a radio access network 110 and a core network 120. The public land mobile network 100 is a cellular telecommunications network comprising a plurality of network cells or radio cells, three of which are represented in FIG. 1 by means of a solid line and reference signs 11, 12, 13, respectively. Typically, each of the radio cells 11, 12, 13 is produced by or corresponds to a base station entity. Three base station entities 111, 121, 131 are represented in FIG. 1. In the public land mobile network 100, typically a plurality of user equipments are camping on the public land mobile network 100 within the network cells 11, 12, 13, i.e. the user equipments are connected or are camping on one of the base station entities 111, 121, 131 serving the respective cell 11, 12, 13. The base station entities 111, 121, 131 are typically a base station, e.g. BTS (base transceiver station), NodeB or an eNodeB base station. To provide a suitable radio coverage of the user equipments irrespective of their location, the radio cells 11, 12, 13 typically overlap. Furthermore, overlap of the radio cells 11, 12, 13 is provided to ensure coverage of a certain geographical area not only with respect of one radio access technology but with respect to a plurality of radio access technologies, hereinafter also called different layers of radio coverage. Such an network architecture creates a multi-RAT (or multilayer) and/or multi-frequency radio environment in the public land mobile network 100, where user equipment 20, represented exemplarily in FIG. 1, is located such that it is able to have radio coverage with respect to different radio access technologies and/or with respect to different frequencies or frequency bands of one radio access technology or of different radio access technologies such as GSM (Global System of Mobile communications), GPRS (General Packet Radio System), UMTS (Universal Mobile Telecommunications System), EPS/LTE (Evolved Packet System/Long Term Evolution). due to different radio access technologies and due to different frequencies or frequency bands (within the same radio access technology). Therefore, the user equipment 20 typically has a plurality of possibilities to be connected to the public land mobile network 100 which is represented in FIG. 1 by means of the different radio cells 11, 12, 13 and the respective base station entities 111, 121, 131.

In connected mode of the user equipment 20, the user equipment 20 has a radio connection with one of the base station entities of the public land mobile network 100; in the example represented in FIG. 1 with one of the base station entities 111, 121, 131. The base station entity with which the user equipment 20 is connected is also called the serving base station entity or serving cell base station entity. Other base station entities providing radio coverage to the user equipment 20 (for the same radio access technology or for a different radio access technology, for the same frequency or frequency band or for a different frequency or frequency band) are also called neighbour base station entities or neighbour cell base station entities. In the exemplary situation represented in FIG. 1, the base station entity having reference sign 111 (hereinafter also called the first base station entity 111) is the serving cell base station entity for the user equipment 20, and the base station entities having reference signs 121 (hereinafter also called the second base station entity 121) and 131 (hereinafter also called the third base station entity 131) are potential target base station entities for handover purposes.

According to the 3GPP standardization, e.g. Release 10 of 3GPP TS 36.331, periodic measurements concerning the radio environment of the user equipment 20 are conducted by the user equipment 20 based on instructions received from the serving cell base station entity 111. Thereby, the user equipment 20 explores the surrounding area (i.e. the neighbour cells) of a given (serving) cell to identify if better radio conditions can be provided by another cell (than the serving cell) to the user equipment 20, which ensures mobility of the user equipment 20 within the public land mobile network 100. In a continuous network layer (e.g. a radio access technology), the periodic measurements are typically performed within a given frequency range or frequency band. In this layer, the measurements are triggered with a higher periodicity—to ensure early identification of a target neighbour cell and to ensure a reliable handover to this target cell—in case that the signal strength of the serving cell (measured by the user equipment 20) falls under a certain limit or threshold. In a multi-RAT and/or multi-frequency public land mobile network, other frequency layers of the same radio access technology or other radio access technologies have to be considered by the user equipment 20, leading to more complex measurements because the user equipment 20 needs to change the serving frequency (or frequency range) and has to perform a synchronisation to the cells on the other frequency layer or the other radio access technology. This necessitates an interruption of an active data transmission between the user equipment 20 and the serving cell base station entity 111, and therefore at least potentially leads to a reduction of user experience.

In order to have the measurements conducted by the user equipment 20, the serving cell base station entity 111 typically transmits a configuration information to the user equipment 20, the configuration information specifying to which of the possible target neighbour cell base station entities (of the same or different frequency or frequency band and/or of the same or different radio access technologies) measurements, conducted by the user equipment 20, should occur. According to the present invention, a measurement activation/deactivation information is transmitted from the serving cell base station 111 to the user equipment 20. The measurement activation/deactivation information is related to future inter-frequency and/or inter-RAT measurements towards the neighbour cell base station entity 121 (as an example of typically a plurality of possible inter-frequency and/or inter-RAT neighbour cells) to be either activated or set to a non-permanent state, or to future inter-frequency and/or inter-RAT and/or intra-frequency measurements towards the neighbour cell base station entity 121 (as an example of typically a plurality of possible inter-frequency and/or inter-RAT and/or intra-frequency neighbour cells) to be either activated or set to a non-permanent state.

The activation of periodic measurements towards potential target neighbour cell base station entities (using the measurement activation/deactivation information) means performing the (future) measurements towards this potential target neighbour cell base station entity according to the standardized manner. The temporary deactivation of periodic measurements (or the setting to a non-permanent state) towards potential target neighbour cell base station entities (using the measurement activation/deactivation information) means performing the (future) measurements towards this potential target neighbour cell base station entity less often or not at all or less often because a lower triggering threshold (triggering the respective measurement) is applied. The temporary deactivation (or the setting to a non-permanent state) of certain neighbour cell measurements aims at avoiding such measurements that are comparably likely to fail, e.g. due to the fact that the middle frequency of a specific band is not available in the area of the serving cell, or that the mobility is perfectly assured by the cells having the same frequency (of frequency band) as the serving cell or by the cells of the same radio access technology of the serving cell. As a consequence, measurements are configured only permanently (or are only activated) if target cells (i.e. neighbour cells) as handover candidates do really exist or used above configurable thresholds. Thereby, it is advantageously possible to configure the behaviour of the serving cell in a self-organising way (i.e. without significant efforts to individually configure the measurement configuration for each radio cell individually) to reduce the amount of measurements to be performed by the terminal while reaching an optimal customer experience.

According to the present invention, the public land mobile network 100 comprises a decision and control engine 125 or decision and control node 125. The decision and control node 125 decides about the generation of specific measurement activation/deactivation information messages in specific cells 11, 12, 13 and thereby controls whether for a specific kind of inter-frequency and/or inter-RAT and/or intra-frequency measurement with respect to a specific relationship of a serving cell and a neighbour cell the inter-frequency and/or inter-RAT and/or intra-frequency measurement should be activated or set to a non-permanent state/be temporarily deactivated, i.e. via transmitting a corresponding measurement activation/deactivation information to the user equipment 20. According to the present invention, there is the possibility to realize such a decision and control node 125 according to a so-called central solution (as represented in FIG. 1) or according to a so-called distributed solution (not represented in FIG. 1). According to the central solution, the decision and control node 125 is provided in a central entity, typically connected with a network management system of the related network elements. According to the distributed solution, the decision and control node 125 is provided in the respective local network element, especially the base station entity. According to the present invention, also a combined approach could be realized, where for a plurality of local network elements, a decision and control node 125 is locate in a central entity (with respect to this plurality of local network elements) and for a plurality of other local network elements, the decision and control node 125 is provided in the respective local network elements (of the plurality of other network elements).

According to both the central solution and the distributed solution, it has to be assured that during operation of a (serving) cell (or the respective base station entity) in the first phase of getting into normal operation, neighbour cell measurements are configured so as to detect (all) available neighbours using the ANR procedure and later on from time to time to react on changes in the network (e.g. when neighbour cells are put in or taken out of operation). This leads to the following scenario: A base station is installed and is put in commercial usage for the first time (e.g. after first deployment or after initial reset of the base station). In this situation, for a configurable time, all kinds of measurement jobs for this (serving) cell shall be activated; the timer shall only be counted down if the (serving) cell is really on air and not in some pre-operation status anymore. If during this initial period (or setup period of the serving base station entity) inter-frequency or inter-RAT target neighbour cells are visible to the user equipments operating under this serving cell, then the corresponding measurement jobs remain activated hereinafter also called "permanent measurement job".

If a specific target frequency or RAT (of a neighbour cell) is not measured (by the user equipment operating under this serving cell) or their neighbour relationships have not been used above configurable thresholds, then the appropriate measurement job shall be parked for a configurable time period and periodically be activated (or temporarily deactivated) for a predetermined time interval (hereinafter also called "periodic measurement job") as long as the specific frequency or RAT is not detected. If the specific frequency or RAT is detected again, the corresponding measurement job is changed into a permanent job, i.e. the measurement activation/deactivation information indicates to the user equipment 20 to conduct the measurement in the standardized manner (i.e. according to the measurement configuration information received from the serving cell base station entity). Thereby, it is advantageously possible to ensure that the radio environment is periodically checked to recognise changes of the network configuration as new cells are activated or outages of cells might occur.

Furthermore, in case that the neighbour relationships to inter-frequency or inter-RAT or intra-frequency neighbour cells are not used or not more often triggered and successfully used as their defined configurable thresholds during a comparably long configurable time interval (i.e. the predefined further time interval during which a handover procedure towards the neighbour cell base station entity 121 does not occur), it is assumed that the measurement job is not needed anymore and the status can be changed to the non-permanent state so that only from time to time measurement jobs are activated to this specific neighbour cell target having the specific frequency or RAT; an example of such a situation is the outage of neighbour cells.

Furthermore, in case of the setup of an X2 interface (for LTE) triggered by another site with at least one cell within another centre frequency or frequency band as configured in the cells of the analysed eNodeB, it can be assumed that this can cause changes in the measurement configuration and neighbour relationship situation. In this situation the corresponding (from the centre frequency point of view) non-permanent inter-frequency measurement job has to set to permanent for a specific time to check, if the neighbour relation to the other eNodeB respective its connected cell exist also vice versa and is used.

According to the present invention, the non-permanent state of a measurement can also be achieved by defining a measurement threshold which would be typically quite low, normally near the minimum required cell quality of the serving cell, especially in an LTE system.

According to the central solution of the present invention, for a given cluster of (newly installed an activated) network elements such as base station entities (or for a newly deployed single element), the following procedure can be applied: All measurement jobs are configured for a newly installed base station in a way that all intra-frequency, inter-frequency and Inter-RAT neighbour target cells are activated, i.e. are measured by the respective user equipments. This is done for a certain time period to get statistical evidence on the typical relationship scenario for a given cell. The average figures for occurrence of measurements per category of inter-frequency measurements and/or inter-RAT measurements are given to a central instance, i.e. the central decision and control node 125. If the central decision and control node 125 detects that there are no inter-frequency or inter-RAT neighbour cell relationships or that these are not more often triggered and successfully used as related configured thresholds of a given cell, the measurement jobs for the related category (inter-frequency and/or inter-RAT and/or intra-frequency) are set to the non-permanent state by an appropriate configuration message towards the base station entity. This has the consequence that the appropriate measurement jobs are enabled only in those scenarios where the specific relationship category does exist. Analogously to the distributed solution, also with the central solution, the pure de-activation of the measurement jobs can be replaced by using predefined measurement thresholds which would be typically quite low, normally near the minimum required cell quality of the LTE system. In this case the measurement job would not be switched off but used only with a comparably low probability. The steps described for the central solution can be also be performed periodically to explore the environment regarding changes. The appropriate category of measurement job is enabled again if a dedicated relationship is detected.

For both the central solution and the distributed solution, the following additional measures can advantageously be taken to improve both the number of measurements performed and the quality of neighbour detection: For a freshly deployed base station, the following check can be done after some few days with configuration of all measurement categories: the already found neighbours (target cells) by ANR can be analysed; in case of an inter-frequency or inter-RAT or intra-frequency relationship, the status of the activation of the measurement jobs within the target cells has to be checked (e.g. by the decision and control node 125). If the corresponding measurement (related to the frequency and technology of the serving cell) is not active in the target cell, the corresponding measurement job has to be switched on. Furthermore, if neighbour relationships to other frequencies or RATs are detected but never or less often triggered and successfully used (e.g. because of a long distance cell is visible but cannot really bear traffic or due to the interference situation) the related measurement jobs shall be set to non-permanent.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for improved measurement handling by a user equipment in a public land mobile network, the measurement handling being related to measurements that are performed by the user equipment based on measurement configuration information transmitted by the public land mobile network to the user equipment,
wherein the public land mobile network comprises a plurality of base station entities, at least one base station entity of the plurality of base station entities being a serving cell base station entity of the user equipment, and at least one further base station entity of the plurality of base station entities being a neighbour cell base station entity of the serving base station entity of the user equipment,
wherein the method comprises:
transmitting, by the serving cell base station entity, measurement activation/deactivation information to the user equipment, wherein a first state of the measurement activation/deactivation information indicates that future measurements towards the neighbour cell base station entity are activated and a second state of the measurement activation/deactivation information indicates that future measurements towards the neighbour cell base station entity are set to a non-permanent state;
wherein future measurements towards the neighbour cell base station entity being activated corresponds to periodic future measurements towards the neighbour cell base station entity being performed; and
wherein future measurements towards the neighbour cell base station entity being set to a non-permanent state corresponds to future measurements towards the neighbour cell base station entity being temporarily deactivated or being performed less often relative to the periodic future measurements towards the neighbour cell base station entity performed when future measurements towards the neighbour cell base station entity are activated.

2. The method according to claim 1, wherein in case that the measurement activation/deactivation information indicates future measurements towards the neighbour cell base station entity to be in the non-permanent state, future measurements towards the neighbour cell base station entity are temporarily deactivated.

3. The method according to claim 1, wherein the future measurements towards the neighbour cell base station entity are conducted in case that the measurement activation/deactivation information indicates that future measurements are activated, and wherein the future measurements towards the neighbour cell base station entity are temporarily deactivated for at least a predetermined time interval in case that the measurement activation/deactivation information further indicates a temporary deactivation of the future measurements.

4. The method according to claim 1, wherein in case that the measurement activation/deactivation information indicates future measurements towards the neighbour cell base station entity to be in the non-permanent state, future measurements towards the neighbour cell base station entity are configured such that a low measurement threshold is applied.

5. The method according to claim 1, wherein in case that the measurement activation/deactivation information indicates activation of future measurements, the future measurements are conducted either using autonomous gaps or using an indication from a measurement gap configuration information that is part of the measurement configuration information.

6. The method according to claim 1, wherein the measurement activation/deactivation information is transmitted to the user equipment indicating that future intra-frequency measurements towards the neighbour cell base station entity are to be set to the non-permanent state in case that
the neighbour cell base station entity is reported, towards the serving cell base station entity, —either on an interface towards an entity of the public land mobile network, or by the user equipment based on at least one previous measurement—to be unavailable, or
handovers towards the neighbour cell base station entity are triggered less than a configurable attempts threshold and their success rate is less than a configurable threshold during a predefined further time interval.

7. The method according to claim 1, wherein the measurement activation/deactivation information is transmitted to the user equipment indicating that future measurements towards the neighbour cell base station entity are activated in case that
the neighbour cell base station entity is reported, towards the serving cell base station entity, —either on an interface towards an entity of the public land mobile network, or by the user equipment based on at least one previous measurement—to be available, or
a handover procedure towards the neighbour cell base station entity does occur.

8. The method according to claim 1, wherein at least another base station entity of the plurality of base station entities is a further neighbour cell base station entity of the serving base station entity of the user equipment,
wherein further measurement activation/deactivation information is transmitted from the serving cell base station to the user equipment, the further measurement activation/deactivation information indicating that future measurements towards the further neighbour cell base station entity are activated or temporarily deactivated.

9. The method according to claim 8, wherein at an installation time of the serving cell base station entity both
the measurement activation/deactivation information indicates that measurements towards the neighbour cell base station entity are to be conducted, and
the further measurement activation/deactivation information indicates that measurements towards the further neighbour cell base station entity are to be conducted.

10. The method according to claim 1, wherein data indicative of whether the neighbour cell base station entity is available or unavailable is transmitted to a network decision and control node of the public land mobile network.

11. A public land mobile network adapted for improved measurement handling, the measurement handling being related to measurements that are performed by a user equipment based on measurement configuration information transmitted by the public land mobile network to the user equipment, wherein the public land mobile network comprises a plurality of base station entities, at least one base station entity of the plurality of base station entities being a serving cell base station entity of the user equipment, and at least one further base station entity of the plurality of base station entities being a neighbour cell base station entity of the serving base station entity of the user equipment, wherein the serving cell base station entity comprises a processor and a non-transitory computer-readable medium having processor-executable instructions stored thereon, the serving cell base station entity being configured, based on the processor executing the processor-executable instructions, to:
- transmit a measurement activation/deactivation information to the user equipment, wherein a first state of the measurement activation/deactivation information indicates that future measurements towards the neighbour cell base station entity are activated and a second state of the measurement activation/deactivation information indicates that future measurements towards the neighbour cell base station entity are set to a non-permanent state;
- wherein future measurements towards the neighbour cell base station entity being activated corresponds to periodic future measurements towards the neighbour cell base station entity being performed; and
- wherein future measurements towards the neighbour cell base station entity being set to a non-permanent state corresponds to future measurements towards the neighbour cell base station entity being temporarily deactivated or being performed less often relative to the periodic future measurements towards the neighbour cell base station entity performed when future measurements towards the neighbour cell base station entity are activated.

12. A non-transitory, computer-readable medium having processor-executable instructions stored thereon, the processor-executable instructions, when executed, facilitating performance of a method for improved measurement handling by a user equipment in a public land mobile network, the measurement handling being related to measurements that are performed by the user equipment based on measurement configuration information transmitted by the public land mobile network to the user equipment, wherein the public land mobile network comprises a plurality of base station entities, at least one base station entity of the plurality of base station entities being a serving cell base station entity of the user equipment, and at least one further base station entity of the plurality of base station entities being a neighbour cell base station entity of the serving base station entity of the user equipment, wherein the method comprises:
- transmitting, by the serving cell base station, measurement activation/deactivation information to the user equipment, wherein a first state of the measurement activation/deactivation information indicates that future measurements towards the neighbour cell base station entity are activated and a second state of the measurement activation/deactivation information indicates that future measurements towards the neighbour cell base station entity are set to a non-permanent state:
- wherein future measurements towards the neighbour cell base station entity being activated corresponds to periodic future measurements by the user equipment towards the neighbour cell base station entity being performed; and
- wherein future measurements towards the neighbour cell base station entity being set to anon-permanent state corresponds to future measurements by the user equipment towards the neighbour cell base station entity being temporarily deactivated or being performed less often relative to the periodic future measurements towards the neighbour cell base station entity performed when future measurements towards the neighbour cell base station entity are activated.

13. The method according to claim 4, wherein the low measurement threshold is near the minimum required cell quality of the public land mobile network.

* * * * *